No. 12,198. REISSUED FEB. 23, 1904.

O. SCHLEICHER.

MACHINE FOR MAKING BASKETS.

APPLICATION FILED AUG. 8, 1903.

2 SHEETS—SHEET 1.

Witnesses

Jno. Ennis

H. H. Simms

Inventor

Oscar Schleicher

By Knight Bros

Attorneys

No. 12,198. REISSUED FEB. 23, 1904.
O. SCHLEICHER.
MACHINE FOR MAKING BASKETS.
APPLICATION FILED AUG. 8, 1903.
2 SHEETS—SHEET 2.
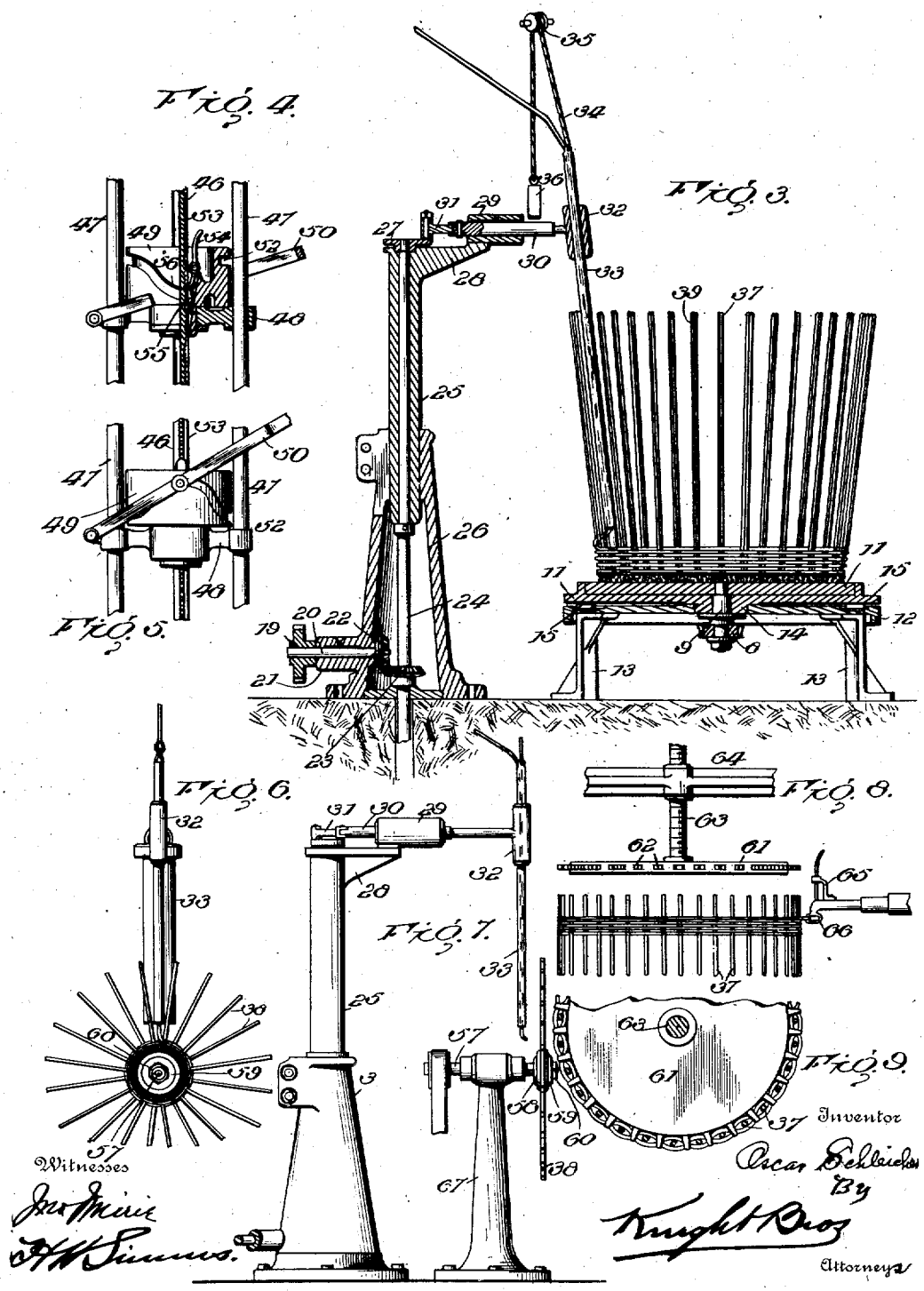

No. 12,198. Reissued February 23, 1904.

UNITED STATES PATENT OFFICE.

OSCAR SCHLEICHER, OF HEINSBERG, GERMANY, ASSIGNOR, BY DIRECT AND MESNE ASSIGNMENTS, TO THE WILLIAMS MANUFACTURING COMPANY, A CORPORATION OF MASSACHUSETTS.

MACHINE FOR MAKING BASKETS.

SPECIFICATION forming part of Reissued Letters Patent No. 12,198, dated February 23, 1904.

Original No. 693,911, dated February 25, 1902. Application for reissue filed August 3, 1903. Serial No. 168,849.

*To all whom it may concern:*

Be it known that I, OSCAR SCHLEICHER, manufacturer, a subject of the King of Prussia, Emperor of Germany, residing at Heinsberg, Rhineland, in the Kingdom of Prussia, Empire of Germany, have invented certain new and useful Improvements in Machines for Making Baskets; and I do hereby declare the following to be a full, clear, and exact description of the invention, such as will enable others skilled in the art to which it appertains to make and use the same.

The object of my present invention is to provide a simple yet effective machine for making baskets mechanically. The machine is equally effectual whether using wire, reeds, wickers, straw, or hemp ropes in making such baskets. In all cases the machine turns out in the shortest time a well-made basket regular in all its parts and does the work cheaper than it can be done by hand.

Figure 1:
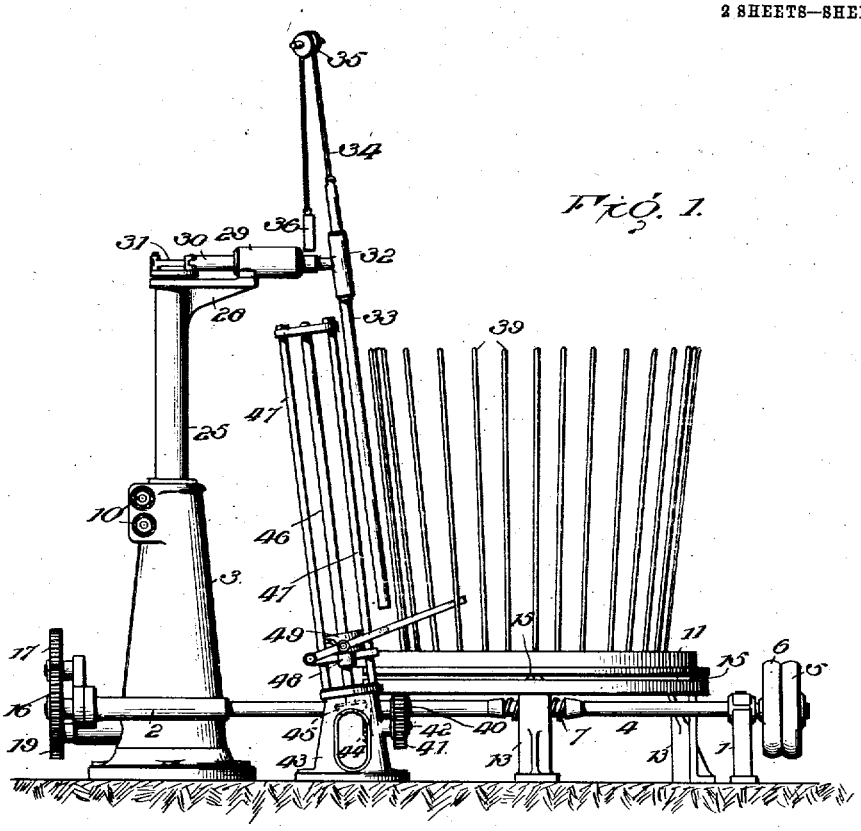
Figure 2:
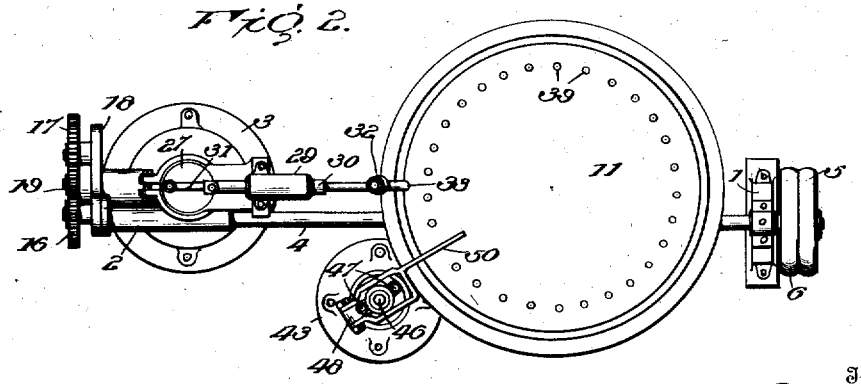

In the accompanying drawings, Figure 1 is a side elevation of the machine with the auxiliary rods. Fig. 2 is a ground plan of same. Fig. 3 is a vertical detail section of the machine. Fig. 4 is a view of the device manipulating the batting-iron, partly in section. Fig. 5 is a view in elevation of the same device. Fig. 6 is a front view, and Fig. 7 a side view, of the device for making basket-bottoms. Fig. 8 is a side view of a device for making basket-mantles of cylindrical form. Fig. 9 is a plan view of same.

In the bracket 1 and in the sleeve 2 of the standard 3 is journaled the shaft 4, provided with the loose pulley 5 and the tight pulley 6 and near its middle a worm 7, engaging the worm-wheel 8, secured to the stud 9 of the circular table, consisting of the disk-table or basket-support 11 and the larger rimmed circular plate 11′. It is clear that said disk may be fastened to the circular plate 11′ in any desirable manner or may form an integral part of the latter. This table is kept concentric with the supporting-frame, comprising a plate 12 and legs 13, by means of the projection 14 entering a corresponding opening in the plate 12. A light working of the circular table or support 11 is assured by employing rollers 15, journaled in the plate 12 and bearing against the under side of table or support 11. The end of shaft 4 projecting through sleeve 2 is provided with a wheel 16, meshing with the idler 17, supported by the arm 18, secured to the flange of the sleeve 2. The idler 17 meshes with a wheel 19, keyed to the shaft 20, journaled in the sleeve 21 of the standard 3. This shaft carries a miter-wheel 22, meshing with another miter-wheel 23, slidingly secured to the vertical shaft 24, held in position in the hollow post 25 by means of a set-collar 26 at the under side of the post and the crank-disk 27 upon the top surface of same. The post 25 can be kept in any position in the standard 3 by simply tightening the bolts 10 of the latter, and is provided with an arm 28, to which is secured the sleeve 29, carrying the longitudinally-sliding bar 30, actuated by the crank-disk 27 by means of the short link 31, pivotally connected to said crank-disk and sliding bar 30. The latter is provided with a sleeve 32, standing at nearly right angles to said bar. In this bar is slidingly held the tube 33, capable of being held in any position by the rope 34 running over the sheave 35 and is provided with a weight 36 of about the same weight as the tube 33. For instance, a basket-bottom has been placed upon the circular table 11 and the upright stakes 37 secured to the radial stakes 38 at the bottom by pointing the latter and splitting the former, or vice versa, and afterward bending the stakes 37 upward at the right point to get the desired diameter of the basket I insert close to said stakes iron or steel rods 39 and secure the stakes 37 to said rods. After this has been done the intertwining material to be used in the manufacture of the basket is introduced into the tube 33, and the lower end of the wire, wicker, straw or hemp rope is fastened at the right point in a suitable manner to the bottom and the machine set in motion. The worm 7 will set the circular table 11 in motion, and with it the parts of the basket secured thereon, and the crank-disk 27 moves the tube 33 in and out between the stakes 37. As these movements take place simultaneously, the intertwining material will be placed alternately on the outside of one stake and on the inside of the other. Instead of changing the direction of the material at every stake this change of direction may take place at every second, third, &c., stake by proportioning the speed of the rotatory table 11 and the crank-disk 27 accordingly. It will thus be seen that the feeding-tube 33 is disposed approximately parallel with the stakes 37 and moves bodily transversely of its length in a straight line, while the basket-stakes move transversely to the movement of the feeding-tube, these movements being so timed that there is no interference between the feeding-tube and the stakes.

As the material must be battened down as the work progresses, a device has been provided to perform this work automatically. The shaft 4 is to this end provided with a spur-wheel 40, meshing with the spur-wheel 41, secured to the shaft 42, journaled in the standard 43. The shaft 42 is provided with a conical wheel 44 at the inside of said standard, meshing with a smaller wheel 45 upon the inclined shaft 46, parallel with the inclined stakes 37 of the basket-mantle. Parallel with said shaft 46 are placed the guide-bars 47, carrying the traverse 48, in which is movably seated a cam-head 49. At the end of said traverse is pivotally secured the forked batting-iron 50, moved up and down by the motion of said head 49 as the pins 51 of the batting-iron 50 enter the groove 52 of the head. By these means the batting-iron 50 strikes the intertwining material twice at every rotation of the cam-head 49. As this head must be lifted as the work advances and at the same time the batting-iron must be in a position to deliver an equally strong blow at any point from the bottom to the top of the basket, the shaft 46 is provided with a slot 53, having a toothed bottom, into which the point of a double-ended pawl 54 enters and is held therein by the spring 55. The pawl 54 prevents the head 49 from turning upon the shaft 46. The lifting of the head 49 and the batting-iron takes place in the following manner: If, for instance, the batting-iron strikes a wicker or another intertwining material in such a position that the point 56 of the head 49 would press the end of the batting-iron lower down than the compressed intertwining material permits, then the point of contact between the batting-iron and the material will act as a fulcrum for the time being and the head and the parts connected therewith be lifted accordingly. If the upward motion of the head 49 is less than the pitch of the teeth at the bottom of the slot 53, the point of the pawl 54 will return to its seat again; but as soon as said motion equals the pitch of said teeth the lower point of the pawl will slip into the next tooth above, and so on, just as the advance of the work necessitates.

The upward motion of the tube 33 is caused by the material escaping from the lower opening of said tube. As mentioned above, this tube is very carefully balanced, and for this reason the stiffness of the escaping material is sufficient to press the tube 33 upward. Supposing wickers to be used in making a basket, it is evident that they would offer a greater resistance in being bent than if a straw or hemp rope were used and naturally would tend to press the tube 33 quicker upward than any of the mentioned materials would do; but this is prevented by the continuous hammering of the batting-iron 50. Experience has shown that the stiffness of the different materials does not interfere with the steady upward motion of said tube.

With some modifications the above-described mechanism may be made use of in making basket-bottoms also, in which case the principal parts of the machine could be arranged as shown in Figs. 6 and 7. The disk 58 is secured to the shaft 57, while the disk 59 is removable and can be pressed against the former by means of the nut 60. Between said disks I place the desired number of radial stakes 38 and retain them in place by tightening the nut 60 and secure in a suitable manner the lower end of the intertwining material. This being done, shaft 57 is set in rotation and the bar 30 set in motion, which here, as in the making of the basket-mantle, winds the material in the described manner around the radial stakes. The head of the standard 43, with the batting-iron, can be so adjusted as to perform its office here in the same manner as described by the manufacture of the basket-mantle. After the bottom has been taken off and the hole been filled in through which the shaft 57 passed its stakes are treated as mentioned above, the bottom is placed upon the circular table 11, the stakes of the mantle inserted, and the mantle finished as described. I could replace the batting-iron by a vertically-movable disk 61 with as many fingers 62 as there are stakes used. This arrangement (shown in Figs. 8 and 9) is especially suitable for cylindrical basket-mantles. In this case the intertwining material only needs pressing down every now and then. The necessary motion is obtained by means of a screw 63 and a traverse 64. The sliding bar 30 of Fig. 3 might take the form shown in Fig. 8, wherein the intertwining material enters through a bracket 65 and is guided to its place by the sleeve 66 on its under side, and yet the work done would be of the same quality and executed in exactly the same manner.

Other modifications of the mechanism for carrying out my invention might be shown, yet all of them would be nothing but a mere repetition of the machine shown in Figs. 1 to 5 in a more or less altered form and consequently not diminish the merits of my invention.

I claim—

1. A machine for making baskets, comprising a fixed support for the stakes of the basket to be formed, means for guiding and intertwining the material, of which the basket is formed, around and between the stakes without changing the relative position of the stakes.

2. A machine for making baskets, comprising a fixed support for the stakes of the basket to be formed, means for guiding and intertwining the material, of which the basket is formed, around and between the stakes without changing the relative position of the stakes, and means for batting down the intertwined material.

3. In a machine for making baskets, the combination with a basket-support moving the basket-stakes in a path, of a strand-feeding device movable completely from one side of the basket-stakes to the other in a path transverse to the path of the stakes.

4. In a machine for making baskets, the combination of a feeding device movable bodily in a straight path, a basket-support, and means for moving the basket-support to carry the stakes of the basket in the path transversely to the path in which the feeding devices move without interference with the feeding device.

5. In a machine for making baskets the combination with the rotary support, of a feeding-tube approximately parallel with the stakes of the basket and means for moving the tube transversely to its length between the stakes.

6. In a basket-making machine, a feeding-tube movable bodily approximately parallel with the stakes of the basket and between the same and means for moving the tube bodily.

7. In a basket-making machine, a counterbalanced feeding-tube movable bodily approximately parallel with the stakes of the basket and between the same and means for moving the tube bodily.

8. In a basket-making machine, the combination of the basket-support, a feeding device movable vertically relatively to the support, and a counterbalance for said device.

9. In a basket-making machine, the combination of the basket-support, an approximately vertically disposed tube movable vertically relatively to the support, and a counterbalance for said tube.

10. In a machine for making baskets, a feeding device comprising, the slide-bar, means for reciprocating the same, and a feed-tube slidingly mounted in said bar.

11. In a machine for making baskets, a feeding device comprising a hollow post, a reciprocal bar mounted on said post, a shaft mounted within the post, connections between the reciprocal bar and the shaft, and a feed-tube, slidingly mounted on the reciprocal bar.

12. In a machine for making baskets, a feeding device comprising a hollow post, a reciprocal bar mounted on said post, a shaft mounted within the post, connections between the reciprocal bar and the shaft and a counterbalanced feed-tube slidingly mounted on the reciprocal bar.

13. In a machine for making baskets, a feeding device comprising a standard, a hollow post adjustable in said standard, a shaft journaled in the hollow post, a sliding bar, a crank-disk and a link connecting the shaft and the sliding bar, and a feed-tube slidingly mounted in the sliding bar.

14. In a machine for making baskets, the combination with the rotary basket-support, of a hollow post, a shaft journaled in the post, a sliding bar mounted on the post, connections between the sliding bar and the shaft, a feeding device carried by the sliding bar, and means for operating the shaft in the hollow post and rotating the basket-support simultaneously.

15. In a basket-making machine, a support for the basket comprising a table and a plurality of removable rods disposed to conform to the shape desired for the basket and to which the stakes of the basket are secured.

16. In a basket-making machine, the combination with the basket-forming means, of a batting device, and means automatically advancing the batting device, as the size of the basket increases, said means being advanced by the material acting upon the batting-iron.

17. In a basket-making machine, the combination of the basket-forming mechanism of a batting device comprising a batting-iron, a shaft for operating the batting-iron, and means automatically advancing said batting-iron on the shaft as the size of the basket increases.

18. A batting device for basket-making machines comprising a shaft, a cam-head rotating with but adapted to slide on the shaft, and carrying the batting-iron with it, a connection between the cam-head and batting-iron for operating said batting-iron, and means advancing the cam-head and the batting-iron on the shaft.

19. In a machine for making baskets, the combination with the basket-support, of a shaft provided with teeth, a pawl adapted for engagement with the teeth and a batting-iron carried with the pawl.

20. A batting device for basket-making machines comprising a shaft provided with teeth, a cam-head rotating and sliding on the shaft, a batting-iron held against rotary movement, and sliding on the shaft with the cam-head, a connection between the cam-head and the batting-iron for operating said iron, and a pawl adapted for engagement with the teeth on the shaft to advance the batting-iron and cam-head.

21. A machine for making baskets, comprising a rotatory table provided with removable auxiliary iron or steel rods, means for supporting and rotating said table, self-adjusting means for batting down and intertwining material as the work advances, a standard carrying a longitudinally and radially adjustable post, a rotatory shaft therein for imparting motion to the tube guiding the intertwining material around the stakes of the basket, and means for operating these several parts.

22. In a machine for making baskets, the combination of a rotating shaft with a rotatory table, a plurality of removable auxiliary iron or steel rods on said table, a worm on the table, a worm upon said shaft imparting motion to the worm-wheel of said rotatory table, a frame supporting said table, a second shaft, a spur-wheel on the second shaft, a spur-wheel upon said first-mentioned rotating shaft meshing with the spur-wheel on the second shaft, an inclined shaft, miter-wheels forming connection between the second shaft and the inclined shaft, a standard in which the miter-wheels are mounted, guide-rods upon said standard parallel with inclined shaft, a traverse sliding upon said guide-rods, a rotating head in said traverse, having a groove, a batting-iron hinged to said traverse, pins on the batting-iron entering the groove in said head which in rotating actuates said batting-iron, the said inclined shaft having a toothed groove, a double-ended pawl in said rotating head, and a spring in said head to press the lower point of said pawl into the teeth of said groove.

23. In a machine for making baskets, the combination of a rotatory table, a number of removable auxiliary iron or steel rods for said table, means for rotating said table, an inclined shaft, means for imparting motion to said inclined shaft, a head slidingly mounted upon said inclined shaft, batting-iron-self-adjusting means within said head, a main driving-shaft imparting motion to the rotatory table and the inclined shaft, a longitudinally and radially adjustable post, a vertical shaft, miter-gears holding the vertical shaft in the post, a spur-wheel on the end of the main driving-shaft, an idler mounted on the main driving-shaft and meshing with the spur-wheel, a second spur-wheel meshing with the idler and connected with the vertical shaft, a crank-disk on one end of the vertical shaft, an arm on the vertical post, a sleeve on the arm, a sliding bar guided in the sleeve, a T-shaped head for the sliding bar, a tube movable in the T-shaped head, and means to counterbalance the tube.

In testimony that I claim the foregoing as my invention I have signed my name in presence of two subscribing witnesses.

OSCAR SCHLEICHER.

Witnesses:
ADOLF KREBS,
HENRY QUADFLUX.